(12) United States Patent
Sugamata et al.

(10) Patent No.: US 7,912,325 B2
(45) Date of Patent: Mar. 22, 2011

(54) OPTICAL CONTROL ELEMENT

(75) Inventors: Tohru Sugamata, Tokyo (JP); Satoshi Oikawa, Tokyo (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 0 days.

(21) Appl. No.: 11/887,084

(22) PCT Filed: Mar. 30, 2006

(86) PCT No.: PCT/JP2006/306624
§ 371 (c)(1),
(2), (4) Date: Jan. 26, 2009

(87) PCT Pub. No.: WO2006/106807
PCT Pub. Date: Oct. 12, 2006

(65) Prior Publication Data
US 2009/0202189 A1    Aug. 13, 2009

(30) Foreign Application Priority Data

Mar. 31, 2005  (JP) .................................. 2005-104307

(51) Int. Cl.
*G02F 1/01*  (2006.01)
*G02F 1/35*  (2006.01)
(52) U.S. Cl. ............................................... 385/1; 385/2
(58) Field of Classification Search .................. None
See application file for complete search history.

(56) References Cited

U.S. PATENT DOCUMENTS

| | | | |
|---|---|---|---|
| 4,709,978 A | 12/1987 | Jackel | |
| 7,218,819 B2 * | 5/2007 | Aoki et al. | 385/40 |
| 7,310,453 B2 * | 12/2007 | Ichikawa et al. | 385/3 |
| 7,424,181 B2 * | 9/2008 | Haus et al. | 385/16 |
| 7,502,530 B2 | 3/2009 | Kondo et al. | |
| 2003/0053729 A1 | 3/2003 | Shi | |

FOREIGN PATENT DOCUMENTS

| | | |
|---|---|---|
| JP | 56-164313 | 12/1981 |
| JP | 58-202406 A | 11/1983 |
| JP | 61-160703 A | 7/1986 |
| JP | 64-018121 | 1/1989 |
| JP | 4-190321 | 7/1992 |
| JP | 4-204524 A | 5/1995 |
| JP | 2003-215519 | 7/2003 |
| JP | 2004-093905 | 3/2004 |

* cited by examiner

*Primary Examiner* — Omar Rojas
(74) *Attorney, Agent, or Firm* — Chapman and Cutler LLP

(57) ABSTRACT

There is provided an optical control element in which non-guided light is prevented from entering into an optical waveguide and which is excellent in optical properties, such as optical modulation properties. A media processor, such as a CD publisher, having a function as a media library.

An optical control element includes: a substrate formed of a material having an electro-optical effect; and an optical waveguide formed on a top or bottom surface of the substrate. The optical waveguide has a modulation region b (s) and non-modulation regions a and c along the propagating direction of a light wave propagating through the optical waveguide. In the case when the modulation region is configured to include a single optical waveguide, propagation constants $\beta_0$ to $\beta_3$ of optical waveguides in the modulation region and the non-modulation region adjacent to each other are set to different values in the modulation region and the non-modulation region. In the case when the modulation region is configured to include a plurality of optical waveguides, a propagation constant of at least one of the optical waveguides in the modulation region is set to a value different from that in the non-modulation region.

14 Claims, 9 Drawing Sheets

(a)

(b)

(a)

(b)

OPTICAL CONTROL ELEMENT

TECHNICAL FIELD

The present invention relates to an optical control element, and in particular, to an optical control element having an optical waveguide in a substrate formed of a material having an electro-optical effect.

BACKGROUND ART

In an optical communication field or an optical measurement field, a waveguide type optical modulator in which an optical waveguide and a modulation electrode are formed on a substrate having an electro-optical effect has been often used conventionally.

In particular, since the amount of transmitted information tends to increase with the development of multimedia, it is necessary to widen a band of a light modulation frequency. In order to realize that described above, an external modulation method using a $LiNbO_3$ (hereinafter, referred to as 'LN') modulator or the like has been used. However, it is necessary to realize speed matching between a light wave and a microwave, which is a modulated signal, and to reduce a driving voltage in order to widen the band of the LN modulator.

As a means for solving the problems, it is known that a condition of speed matching between a microwave and a light wave is satisfied, and at the same time, a driving voltage is reduced by making a substrate thin.

In the following Patent Document 1 or 2, an effective refractive index of a microwave is reduced by providing an optical waveguide and an modulation electrodes in a thin substrate (hereinafter, referred to as a 'first substrate') having a thickness of 30 μm or less and bonding another substrate (hereinafter, referred to as a 'second substrate') having a dielectric constant lower than the first substrate to the first substrate, such that the speed matching between the microwave and a light wave is realized and the mechanical strength of the substrate is raised.

Patent Document 1: JP-A-64-18121
Patent Document 2: JP-A-2003-215519

In Patent Document 1 or 2, LN is used for the first substrate and a material having a lower dielectric constant than LN, such as quartz, glass, and alumina, is used for the second substrate. In the combination of these materials, DC drift or temperature drift according to a temperature change occurs due to a difference between coefficients of linear expansion. In order to eliminate such problem, Patent Document 2 discloses that the first substrate and the second substrate are bonded to each other using an adhesive having a coefficient of linear expansion close to the first substrate.

However, in the case of an optical control element where an optical waveguide is formed, for example, a Mach-Zehnder type LN optical modulator, as shown in FIG. 1 (a), a problem occurs in that input light 10 not coupled with an optical waveguide within the optical modulator propagates through a substrate other than the optical waveguide as decoupled light in a part where an optical fiber and the optical modulator are combined, or scattered light 11 or radiant light 12 in the optical waveguide or particularly in a Y-branch part propagates through the substrate in the same manner. Further, as shown in FIG. 1(b), there also occurs a problem, such as crosstalk in which a part 13 of propagating light shifts to another optical waveguide, between adjacent optical waveguides such as branched optical waveguides.

Such decoupled light, scattered light, and crosstalk light (hereinafter, referred to as 'non-guided light') are incident on the optical waveguide. This causes a trouble, for example, a modulation curve (ideally, a function of $cos^2 \theta$) of the optical modulator is distorted.

The inventors have found out that the following phenomena are especially noticeable particularly in the case when the thickness of a substrate formed with an optical waveguide is 30 μm or less or twice the mode field diameter of guided light or less.

(1) The mode diameter of guided light tends to extend in the lateral direction (direction parallel to a substrate surface) as compared with the longitudinal direction (direction perpendicular to the substrate surface), and so decoupled light or various kinds of scattered light increase, and crosstalk between waveguides increases.

(2) Non-guided light, such as decoupled light, propagates through the substrate like guided light and is recoupled with a later-stage waveguide.

Due to the phenomena described above, a modulation curve is largely distorted. As a result, a serious problem in characteristics of an optical modulator or control of the optical modulator occurs, for example, the extinction ratio of the light modulator deteriorates or the maximum amount of transmitted light of the modulation curve differs.

An effect in the case when the substrate is made thin will be described using a case of an optical modulator, which has a Mach-Zehnder type optical waveguide shown in FIG. 2(a), as an example. FIGS. 2(b) and 2(c) are cross-sectional views taken along the dashed-dotted lines A and B, respectively. The cross-sectional shape 23 of light waves passing through two branched optical waveguide portions 3 and 4 is a shape extending in the lateral direction of a substrate 1, as shown in FIG. 2(b). In addition, a light wave 12 radiated from a Y-branch part where branched optical waveguide portions join also shows a shape extending in the lateral direction as shown in FIG. 2(c), and the light wave 12 is extremely close to a light wave 24 propagating through an optical waveguide 5. In such condition, non-guided light, which is the radiant light 12, and the light wave 24 propagating through an optical waveguide 5 are easily recoupled with each other, and it is a main cause of deterioration of a modulation characteristic of the optical modulator. Moreover, although not explained in FIG. 2(a), reference numerals 21, 22, and 20 denote a modulation electrode, a ground electrode, and an adhesive layer for bonding the substrate 1 and a reinforcing plate 21 to each other, respectively.

In order to clarify the influence of a change in the thickness of a substrate, a change in a degree of flatness of the mode diameter of an optical waveguide at the time of changing the thickness of a substrate is shown in FIG. 3. In FIG. 3, a case is assumed in which a dielectric (refractive index n=1.45) is disposed below an LN substrate, an air layer is disposed above the LN substrate, the waveguide width depending on thermal diffusion of Ti is 6 μm, and the Ti thickness at the time of film formation is 500 Å or 900 Å. Assuming that the diameter in the lateral direction is 'x' and the diameter in the longitudinal direction is 'y', 'x/y' is expressed as a degree of flatness of the mode diameter of the optical waveguide. In this case, it is understood that the degree of flatness changes abruptly when the thickness of the LN substrate reaches 30 μm or less in the case that the Ti thickness is 500 Å and when the thickness of the LN substrate reaches 15 μm or less in the case that the Ti thickness is 900 Å.

DISCLOSURE OF THE INVENTION

Problem that the Invention is to Solve

In order to solve the problems described above, it is an object of the present invention to provide an optical control element in which non-guided light is prevented from entering into an optical waveguide and which is excellent in optical properties, such as optical modulation properties.

Means for Solving the Problem

In order to solve the problems described above, according to a first aspect of the present invention, an optical control element includes: a substrate formed of a material having an electro-optical effect; and an optical waveguide formed on a top or bottom surface of the substrate. The optical waveguide has a modulation region and a non-modulation region along the propagating direction of a light wave propagating through the optical waveguide. In the case when the modulation region is configured to include a single optical waveguide, propagation constants of optical waveguides in the modulation region and the non-modulation region adjacent to each other are set to different values in the modulation region and the non-modulation region. In the case when the modulation region is configured to include a plurality of optical waveguides, a propagation constant of at least one of the optical waveguides in the modulation region is set to a value different from that in the non-modulation region.

The 'propagation constant' in the present invention is defined as $2\pi n/\lambda$ ('n' denotes a refractive index and '$\lambda$' denotes a wavelength) and means a constant indicating a phase of propagating light.

According to a second aspect of the present invention, the optical control element according to the first aspect of the present invention is characterized in that adjustment of a propagation constant of the optical waveguide is performed by adjusting a refractive index of the optical waveguide.

According to a third aspect of the present invention, the optical control element according to the second aspect of the present invention is characterized in that adjustment of the refractive index of the optical waveguide is performed by changing the width of the optical waveguide.

According to a fourth aspect of the present invention, the optical control element according to the second aspect of the present invention is characterized in that adjustment of the refractive index of the optical waveguide is performed by diffusing or loading a material, which changes the propagation constant, in the optical waveguide, near the optical waveguide, or on the optical waveguide.

According to a fifth aspect of the present invention, the optical control element according to the fourth aspect of the present invention is characterized in that the material which changes the propagation constant contains at least one of $MgO$, $SiO_2$, $TiO_2$, and $ZnO$.

According to a sixth aspect of the present invention, the optical control element according to any one of the first to fifth aspects of the present invention is characterized in that the propagation constant of a light wave propagating through the optical waveguide satisfies a single mode condition in an input-side optical wave guide portion of the optical waveguide.

According to a seventh aspect of the present invention, the optical control element according to any one of the first to sixth aspects of the present invention is characterized in that the thickness of at least a part of a region, in which the optical waveguide is formed, of the substrate is 30 μm or less or 0.3 to 2.0 times the mode field diameter width of guided light.

The 'mode field diameter width' in the present invention means a width at which the intensity of light becomes $1/e^2$.

Effects of the Invention

According to the first aspect of the present invention, the optical waveguide has a modulation region and a non-modulation region along the propagating direction of a light wave propagating through the optical waveguide. In the case when the modulation region is configured to include a single optical waveguide, propagation constants of optical waveguides in the modulation region and the non-modulation region adjacent to each other are set to different values in the modulation region and the non-modulation region. In the case when the modulation region is configured to include a plurality of optical waveguides, a propagation constant of at least one of the optical waveguides in the modulation region is set to a value different from that in the non-modulation region. Accordingly, it is suppressed that non-guided light generated in an optical waveguide of one region is recoupled with an optical waveguide of another region, and it is possible to stabilize optical properties of the optical control element.

According to the second aspect of the present invention, the adjustment of the propagation constant of the optical waveguide is performed by adjusting the refractive index of the optical waveguide. Accordingly, the adjustment of the propagation constant can be easily performed without making a manufacturing process complicated.

According to the third aspect of the present invention, the adjustment of the refractive index of the optical waveguide is performed by changing the width of the optical waveguide. Accordingly, the propagation constant can be easily adjusted by using a process of forming the optical waveguide.

According to the fourth aspect of the present invention, the adjustment of the refractive index of the optical waveguide is performed by diffusing or loading a material, which changes the propagation constant, in the optical waveguide, near the optical waveguide, or on the optical waveguide. Accordingly, the propagation constant can be adjusted not only in an optical waveguide portion but also in a substrate region other than the optical waveguide. In addition, since it is possible to diffuse or load the material for changing the propagation constant only by changing a part of the process of manufacturing an optical control element, the adjustment of the propagation constant is easily realized.

According to the fifth aspect of the present invention, the material which changes the propagation constant contains at least one of $MgO$, $SiO_2$, $TiO_2$, and $ZnO$. Accordingly, the propagation constant can be easily adjusted by thermal diffusion or film formation.

According to the sixth aspect of the present invention, the propagation constant of a light wave propagating through the optical waveguide satisfies the single mode condition in the input-side optical waveguide portion of the optical waveguide. Accordingly, it is possible to improve the coupling between the optical control element and a single-mode optical fiber.

According to the seventh aspect of the present invention, the thickness of at least a part of a region, in which the optical waveguide is formed, of the substrate is 30 μm or less or 0.3 to 2.0 times the mode field diameter width of guided light. Accordingly, particularly in an optical control element where recoupling of non-guided light or crosstalk is worried, those phenomenons are effectively prevented. As a result, it becomes possible to provide an optical control element excellent in optical properties.

DESCRIPTION OF REFERENCE NUMERALS AND SIGNS

Figure 1:
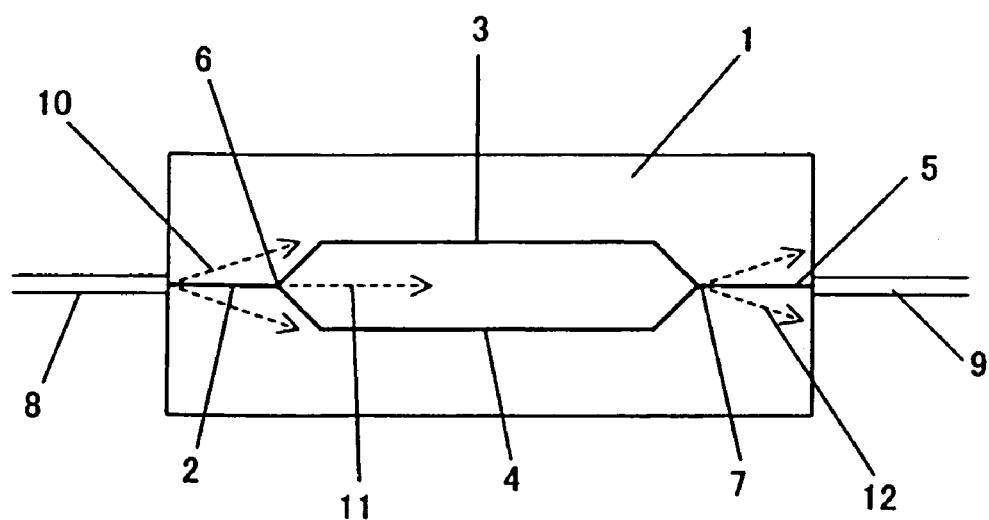
FIGS. 1(a) and 1(b) are views illustrating states of non-guided light.
Figure 1:
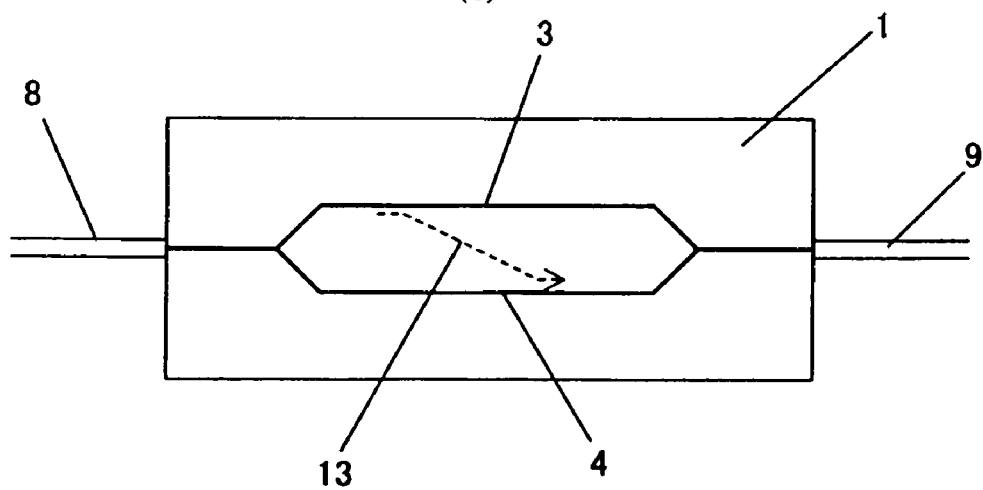

1, 101: substrate
2, 202: input-side optical waveguide portion
3, 4, 103, 104: branched optical waveguide portion
5, 105: output-side optical waveguide portion
6, 7: Y-branch part
10, 11, 12, 13, 110, 111, 112, 113, 114: non-guided light
20: adhesive layer
21: modulation electrode
22: ground electrode
23, 24: guided light
25: reinforcing plate
30, 31, 40: material for changing propagation constant

PREFERRED EMBODIMENTS FOR CARRYING OUT THE INVENTION

Hereinafter, a preferred example of the present invention will be described in detail.

First, a basic technique for preventing recoupling of non-guided light, which is a basis of the present invention, will be described using the following reference example of an optical control element.

The optical control element used as the following reference example is an optical control element including a substrate formed of a material having electro-optical effect, and an optical waveguide formed on a top or bottom surface of the substrate. The optical control element is characterized in that propagation constants of the optical waveguide are set to partially different values.

Figure 4:
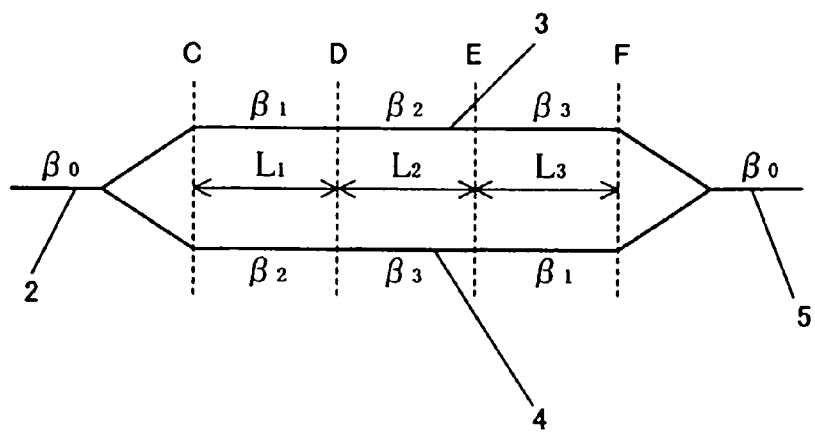
FIG. 4 is a view illustrating a reference example of an optical control element according to the present invention.

FIG. 4 is a view schematically illustrating a reference example related to an optical control element.

Although a Mach-Zehnder type optical waveguide is mainly described as an optical waveguide in the following explanation, the present invention is not limited to the optical waveguide having such shape.

FIG. 4 is a view illustrating only a Mach-Zehnder type optical waveguide. The optical waveguide is configured to include an input-side optical waveguide portion 2, branched optical waveguide portions 3 and 4 obtained by branching off into two portions at a Y-branch part, and an output-side optical waveguide portion 5 disposed subsequent to a Y-branch part serving as a wave combining portion.

In the reference example, in order to prevent crosstalk in the branched optical waveguide portions 3 and 4, the propagation constant $\beta_0$ to $\beta_3$ of a light wave propagating through the optical waveguide changes in each region of the optical waveguide.

Specifically, the branched optical waveguide portion is divided into three regions (three regions of C to D, D to E, and E to F; hereinafter, a region from C to D is expressed as a 'CD region'), and the lengths of the regions are expressed with $L_1$, $L_2$, and $L_3$, respectively. In the respective regions, propagation constants are selected such that the propagation constants are not equal to each other in branched optical waveguide portions that are adjacent to each other. For example, in the CD region, the propagation constant of the branched optical waveguide portion 3 is $\beta_1$, but the propagation constant of the branched optical waveguide portion 4 is $\beta_2$. The propagation constants of the two branched optical waveguide portions 3 and 4 in the CD region are different. Thus, by making the propagation constants of branched optical waveguides adjacent to each other different, it is possible to effectively prevent the crosstalk between the branched optical waveguides from occurring. The same is true for the other DE and EF regions.

Moreover, in the reference example, average values of effective propagation constants $\beta \cdot L$ obtained by multiplying each propagation constant $\beta$ by the length L of each region are set to be equal in the respective branched optical waveguide portions. Specifically, a total sum of the effective propagation constants in the respective branched optical waveguide portions satisfies the following expression.

$$\beta_1 \cdot L_1 + \beta_2 \cdot L_2 + \beta_3 \cdot L_3 = \beta_2 \cdot L_1 + \beta_3 \cdot L_2 + \beta_1 \cdot L_3$$

Thus, by making the average values of effective propagation constants equal, it is possible to make the propagation time of a light wave in the branched optical waveguide portions equal, to make a mechanism for adjusting a phase of a light wave propagating through the branched optical waveguide portions unnecessary or to simplify the mechanism, and to suppress complication of an optical control element or an increase in a manufacturing cost.

In the reference example, a branched optical waveguide portion is divided into three regions. However, the present invention is not limited thereto, but at least a crosstalk phenomenon is suppressed if one or more regions causing the propagation constants not to be equal in branched optical waveguide portions, which are adjacent to each other, exist. In addition, in order to add the function of adjusting the propagation time of a light wave, it is preferable to divide the branched optical waveguide portion into at least two or more regions and set the propagation constants.

Figure 5:
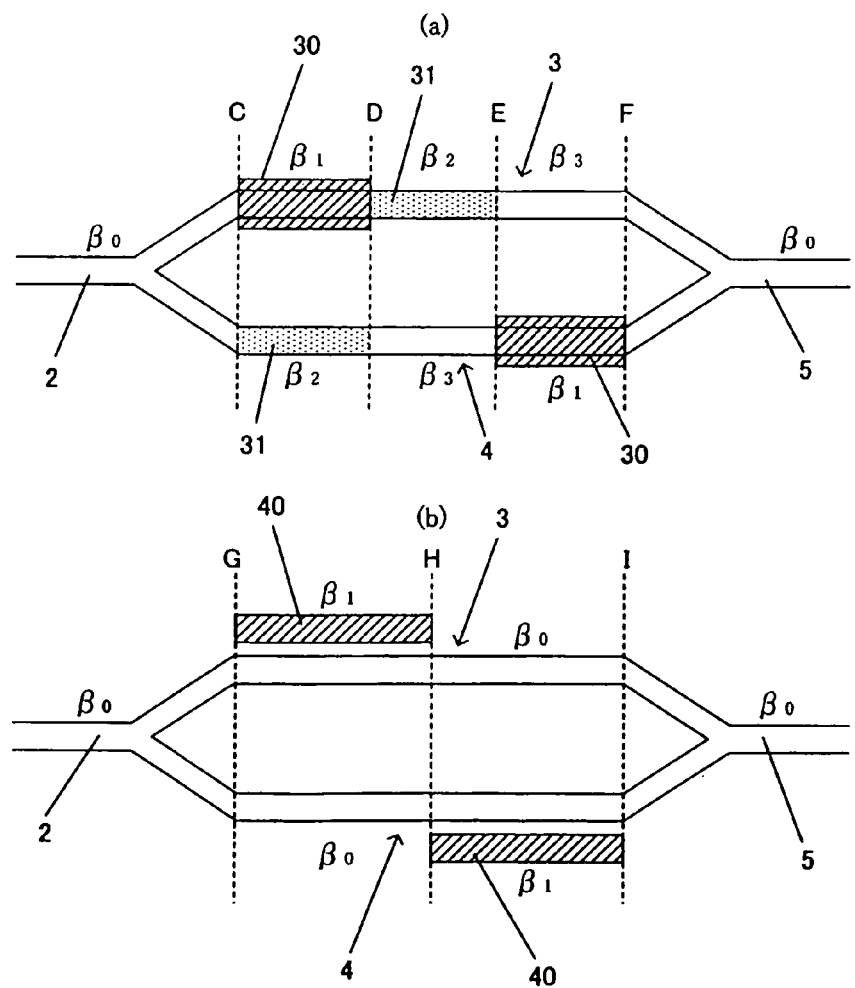
FIGS. 5(a) and 5(b) are views illustrating optical control elements where a material for changing the propagation constant is loaded or diffused.

FIG. 5 is a view illustrating a specific method of adjusting the propagation constant in the reference example. In order to adjust a propagation constant, as indicated by reference numeral 30 or 31 of FIG. 5(a), a material 30 for changing the propagation constant is loaded on an optical waveguide or a material 31 for changing the propagation constant is diffused within the optical waveguide.

MgO, SiO$_2$, TiO$_2$, or ZnO may be used as a material for changing the propagation constant. The propagation constant is adjusted by loading at least one of the materials on a substrate or diffusing at least one of the materials within the substrate.

In particular, $SiO_2$ is preferable in the case of loading the material 30 for changing the propagation constant, and MgO, $TiO_2$, or ZnO is more suitably used in the case of diffusing the material 30 for changing the propagation constant within the optical waveguide.

In addition, a technique of preventing crosstalk by using a diffused material is disclosed in following Patent Document 3.

Patent Document 3: JP-A-56-164313

In addition, as shown in FIG. 5(b), a propagation constant of an optical waveguide can also be adjusted by diffusing or loading a material, which changes the propagation constant, near the optical waveguide. In FIG. 5(b), an example in which a branched optical waveguide portion is divided into two regions of a GH region and an HI region is shown.

Reference numeral 40 denotes a diffused or loaded material for changing the propagation constant. In some cases, the propagation constant may also be adjusted by forming a groove.

Figure 6:
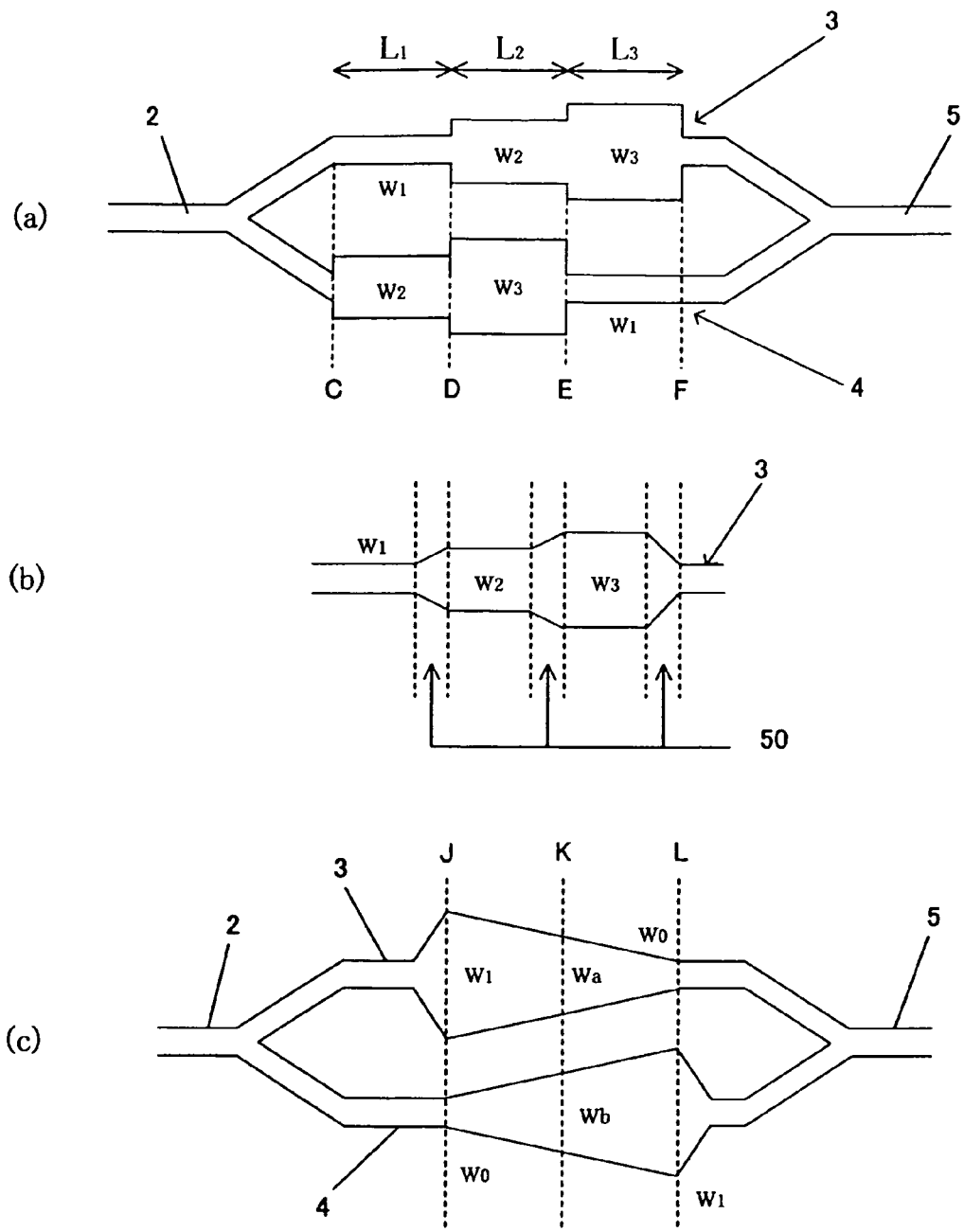
FIG. 6(a) is a view illustrating an optical control element whose propagation constant is changed by adjusting the width of an optical waveguide, with FIG. 6(b) illustrating a part of the branched optical waveguides and transitions regions, and FIG. 6(c) illustrating continuous changes in the width of the waveguide.

FIG. 6 shows another method of adjusting a propagation constant.

FIG. 6(a) shows that the propagation constant changes corresponding to three regions, which may be applied to adjust the propagation constant in the reference example. Here, the adjustment of the propagation constant is performed by changing the width of a branched optical waveguide to three kinds of widths of $w_1$ to $w_3$ in addition to the width of a normal optical waveguide.

Specifically, in the CD region, the width of the branched optical waveguide portion 3 is set as '$w_1$', and the branched optical waveguide portion 4 is set as '$w_2$'. Similarly, even in the DE and EF regions, it becomes possible to make propagation constants different by making the widths of adjacent branched optical waveguide portions different. As a result, the crosstalk between the adjacent branched optical waveguide portions can be prevented.

In addition, a technique of preventing crosstalk by changing the width of an optical waveguide is disclosed in following Patent Document 4.

Patent Document 4: JP-A-4-204524

FIG. 6(b) is a view illustrating only a part of the branched optical waveguide portion 3. As shown in FIG. 6(a), in the case when propagation constants in respective regions are differently set, an abrupt change in the width of an optical waveguide causes a new problem in that a light wave propagating through the optical waveguide is reflected or scattered. For this reason, as shown in FIG. 6(b), a transition region 50 where the width of an optical waveguide changes gradually is provided between regions. Such transition region 50 may also be applied to a case in which the material for changing the propagation constant shown in FIG. 5 is used. In this case, the transition region 50 is configured such that the density or the shape (width or height) of the material spatially changes by degrees.

In addition, FIG. 6(c) shows an example where the width of an optical waveguide continuously changes in a JL region. The width changes continuously from a width $w_1$ to a width $w_0$ in the branched optical waveguide portion 3 and the width changes continuously from the width $w_0$ to the width $w_1$ in the branched optical waveguide portion 4. In FIG. 6(c), although minimum widths and maximum widths in the respective branched optical waveguide portions are set to be equal, the present invention is not limited thereto.

In addition, as for widths $w_a$ and $w_b$ of the branched optical waveguide portions in the middle (dotted line K) of the JL region, it is possible to prevent the crosstalk between adjacent branched optical waveguide portions and to suppress a change in optical characteristics according to the temperature change of an optical control element by setting such that a sum of the two widths $w_a+w_b$ is always constant.

Moreover, as shown in FIG. 6(c), in the case of making the minimum widths $w_0$ and the maximum widths $w_1$ of the respective branched optical waveguide portions equal, it becomes also possible to make a propagation time or a loss of a light wave propagating through the branched optical waveguide portions equal. Accordingly, it is possible to provide an optical control element which is excellent in optical properties.

Next, an optical control element according to the present invention will be described in detail.

In addition, it is needless to say that the above-described method of adjusting the propagation constant of an optical waveguide may also be applied to the optical control element of the present invention.

The optical control element of the present invention includes: a substrate formed of a material having an electro-optical effect; and an optical waveguide formed on a top or bottom surface of the substrate. The optical waveguide has a modulation region and a non-modulation region along the propagating direction of a light wave propagating through the optical waveguide. In the case when the modulation region is configured to include a single optical waveguide, propagation constants of optical waveguides in the modulation region and the non-modulation region adjacent to each other are set as different values in the modulation region and the non-modulation region. In the case when the modulation region is configured to include a plurality of optical waveguides, a propagation constant of at least one of the optical waveguides in the modulation region is set as a value different from that in the non-modulation region.

Figure 7:
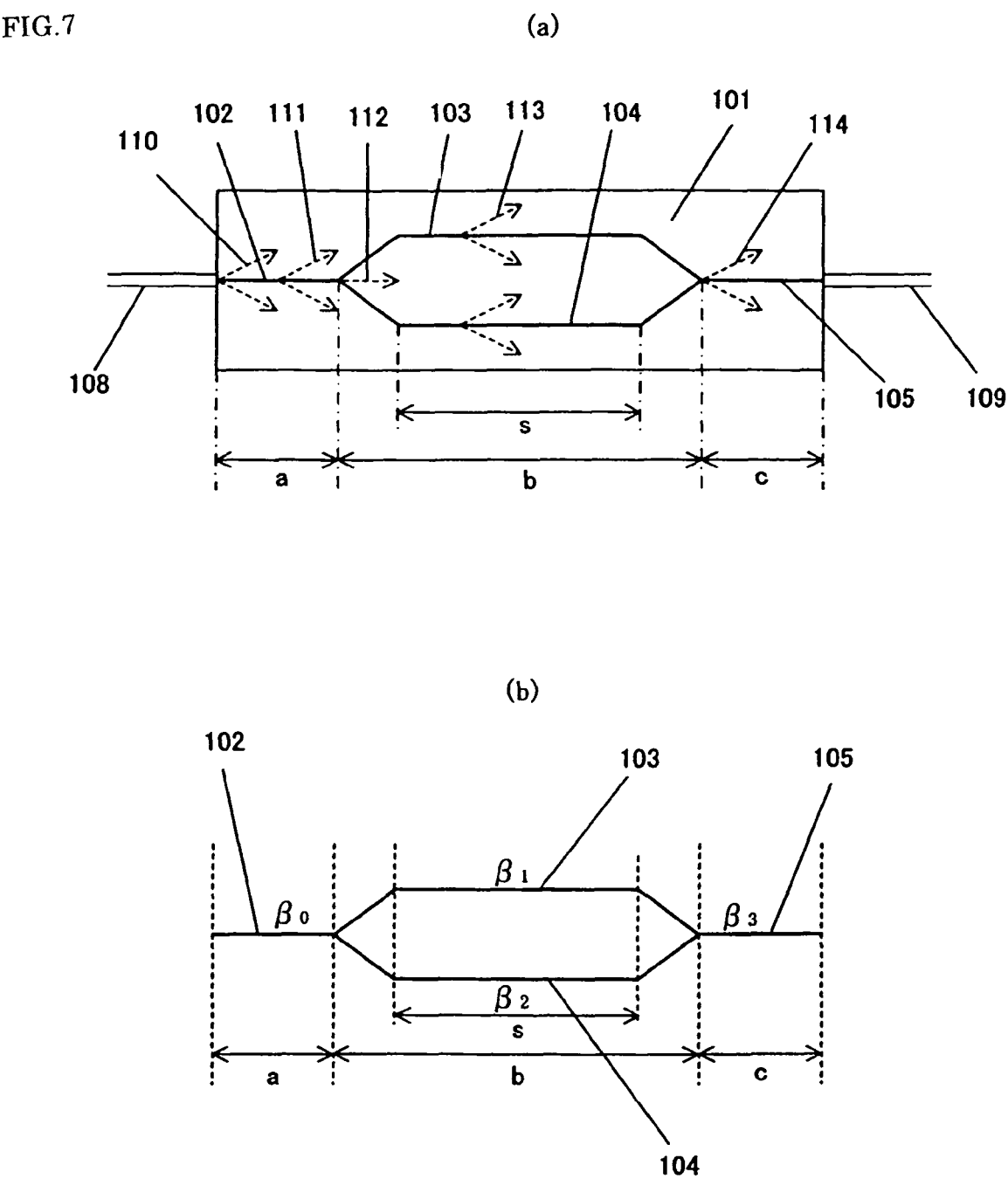
FIG. 7(a) is a view illustrating an optical control element according to a first embodiment of the present invention, with FIG. 7(b) illustrating propagation constants.

FIG. 7 is a view illustrating an optical control element according to a first embodiment of the present invention.

Referring to FIG. 7, light waves incident from an optical fiber 108 propagate through an input-side optical waveguide portion 102 and are divided into branched optical waveguide portions 103 and 104 at a Y-branch part serving as a branch part to then propagate. Furthermore, the light waves are combined at the Y-branch part serving as a wave combining portion, propagate through an output-side optical waveguide portion 105, and are emitted to an optical fiber 9.

Non-guided light when the light waves propagate includes decoupled light 110 generated at a part where the optical fiber and the optical control element are combined, radiant light 111 radiating while propagating through the input-side optical waveguide portion, scattered light 112 radiated from the branch part, radiant light 113 radiating while propagating through the branched optical waveguide portion, and radiant light 114 radiated from the wave combining portion.

For example, a large amount of such non-guided light tends to propagate along the propagating direction of light waves, even though the method of preventing crosstalk between two adjacent optical waveguides of a branched optical waveguide portion is the same as that described above. Accordingly, a probability that the non-guided light will be recoupled with an optical waveguide following after a place, in which the non-guided light was generated, becomes very high. In particular, non-guided light generated in a region 'a' shown in FIG. 7(a) is mainly recoupled with an optical waveguide of a region 'b', or non-guided light generated in the region 'b' is mainly recoupled with an optical waveguide of a region 'c'.

It is an object of the present invention to prevent non-guided light generated in different regions from being recoupled with optical waveguides of the another regions. In particular, it is an object of the present invention to provide an optical control element which is excellent in optical modulation properties, such as an extinction ratio, and in which a light propagation loss in the entire optical control element does not increase by intensively suppressing recoupling of non-guided light generated in adjacent regions.

Taking a look at the entire optical control element along the propagating direction of light waves propagating through an optical waveguide, it is understood that the optical control element shown in FIG. 7(a) includes the regions 'a' and 'c' where light modulation operation is not performed and the region b where light modulation operation is performed.

In the present invention, each of the regions 'a' and 'c' is referred to as a 'non-modulation region' and the region 'b' is referred to as a 'modulation region'.

Here, the 'modulation region' will be explained in more detail. An optical waveguide of the region 'b' is configured to include an optical waveguide portion (also referred to as an active portion and corresponding to a region 's' in FIG. 7(a)) in which light waves propagating through the optical waveguide are modulated by an electric field formed by modulation electrodes (not shown), a portion ranging from a branch part to the region 's', and a portion ranging from the region 's' to a wave combining portion. In the region 's', modulation electrodes and the like are disposed and an electric field applied to the optical waveguide frequently changes. In addition, since the optical waveguide has a shape in which a straight line portion is relatively long, radiation or recoupling of non-guided light is mostly performed in the region 's'. For this reason, the region 's' rather than the entire region 'b' is preferably understood as the 'modulation region'.

Referring to FIG. 7(a), two optical waveguides exist in the modulation region (b or s). However, the present invention is not limited to only the optical control element having a plurality of optical waveguides in the modulation region. For example, it may be possible to use an optical control element having a single optical waveguide in a modulation region, such as an optical phase modulator.

Figure 8:
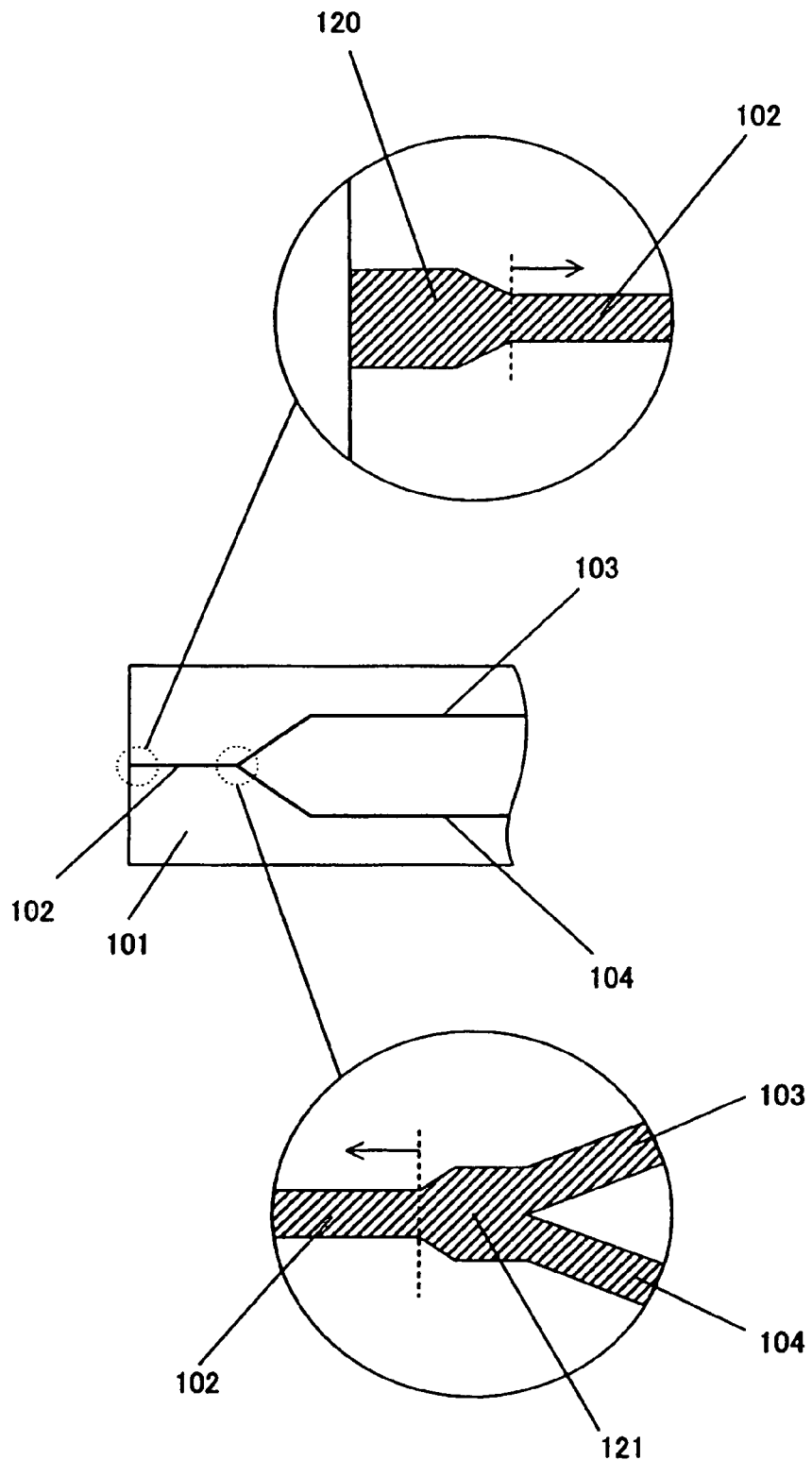
FIG. 8 is a view explaining a non-modulation region.

Further, even for the 'non-modulation region', an optical waveguide of the non-modulation region does not have always a single propagation constant, unlike that shown in FIG. 8.

FIG. 8 is an enlarged view illustrating an input part and an output part (branch part) of the input-side optical waveguide portion 102 using a circle.

As shown in FIG. 8, the input part has a portion 120, in which the optical waveguide width increases toward an optical fiber side, in order to improve the coupling efficiency of an optical fiber and the input-side optical waveguide portion 102. Moreover, in the branch part, a portion 121 where the width of an optical waveguide of the branch part increases is formed and then the portion 121 is branched into branched optical waveguide portions 103 and 104 in order for single mode light propagating through the input-side optical waveguide portion 102 to branch off with high efficiency.

For this reason, except for such input portion 120 or output portion 121 where the width of the optical waveguide changes abruptly, a range from the position of a dotted line to the arrow direction in a circle of FIG. 8 may be preferably understood as a range of the 'non-modulation region'.

In the optical control element of the present invention, the recoupling of non-guided light is prevented paying attention to a propagation constant of an optical waveguide of the non-modulation region and a propagation constant of an optical waveguide of a modulation region.

FIG. 7(b) is a view illustrating the optical waveguide of the optical control element shown in FIG. 7(a), where propagation constants are provided.

In order to prevent non-guided light generated in the optical waveguide 102 of the non-modulation region 'a' from being recoupled with the optical waveguides 103 and 104 of the modulation region b (or s), the propagation constant $\beta_0$ of the optical waveguide 102 needs to be different from the propagation constant $\beta_1$ of the optical waveguide 103 or the propagation constant $\beta_2$ of the optical waveguide 104 ($\beta_0 \neq \beta_1$ or $\beta_0 \neq \beta_2$). In this case, $\beta_0$ does not need to be different from both $\beta_1$ and $\beta_2$. Accordingly, the recoupling of non-guided light can be prevented to some degree by setting the $\beta_0$ to be different from at least one of $\beta_1$ and $\beta_2$. Obviously, in the case when only a single optical waveguide exists in the modulation region, the propagation constant of the optical waveguide needs to be different from that in the non-modulation region.

Next, in order to prevent non-guided light generated in the optical waveguides 103 and 104 of the modulation region 'b' (or 's') from being recoupled with the optical waveguide 105 of the non-modulation region 'c', the propagation constant $\beta_1$ of the optical waveguide 103 or the propagation constant $\beta_2$ of the optical waveguide 104 needs to be different from the propagation constant $\beta_3$ of the optical waveguide 105 ($\beta_1 \neq \beta_3$ or $\beta_2 \neq \beta_3$). $\beta_3$ does not need to be different from both $\beta_1$ and $\beta_2$. In addition, even in the case when only a single optical waveguide exists in the modulation region, that described above is similarly applied.

In addition, in order to prevent the crosstalk between the optical waveguides 103 and 104 in the modulation region 'b' (or 's'), it is preferable to adjust the propagation constants so as to be different from each other, for example, $\beta_1 \neq \beta_2$, as explained above using FIGS. 4 to 6.

Figure 9:
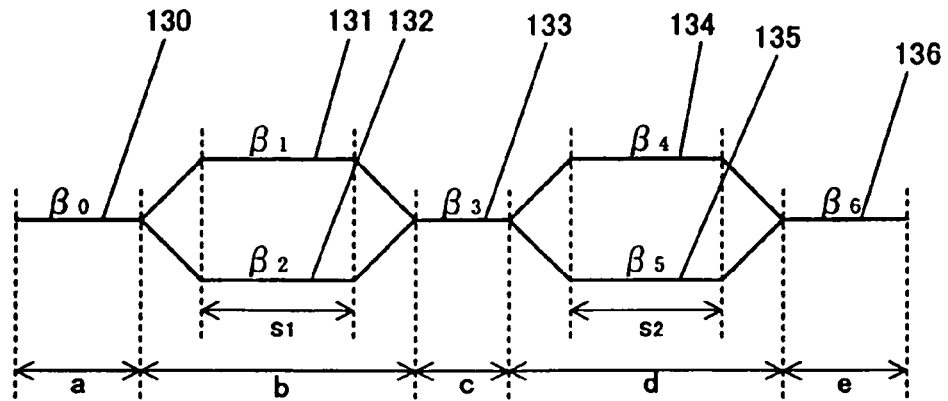
FIG. 9 is a view illustrating an optical control element according to a second embodiment of the present invention.

FIG. 9 is a view illustrating an optical control element according to a second embodiment of the present invention.

In the second embodiment, a technique of preventing the recoupling of non-guided light in a case when Mach-Zehnder type optical waveguides are connected in series to each other will be described.

When an optical waveguide shown in FIG. 9 is viewed along the propagating direction of a light wave within the optical waveguide, the optical waveguide includes a non-modulation region 'a', a modulation region 'b' (or s1), a non-modulation region 'c', a modulation region 'd' (or s2), and a non-modulation region 'e' in this order.

As explained above with reference to FIG. 7, it is possible to suppress the recoupling of non-guided light if the following conditions with respect to adjacent regions are satisfied. The propagation constants of optical waveguides 130 to 136 are expressed as $\beta_0$ to $\beta_6$, as shown in FIG. 9.

(1) Relationship between the non-modulation region 'a' and the modulation region 'b': $\beta_0 \neq \beta_1$ or $\beta_0 \neq \beta_2$ (2) Relationship between the modulation region 'b' and the non-modulation region 'c': $\beta_1 \neq \beta_3$ or $\beta_2 \neq \beta_3$ (3) Relationship between the non-modulation region 'c' and the modulation region 'd': $\beta_3 \neq \beta_4$ or $\beta_3 \neq \beta_5$ (4) Relationship between the modulation region 'd' and the non-modulation region 'e': $\beta_4 \neq \beta_6$ or $\beta_5 \neq \beta_6$ In order to prevent the crosstalk in the respective modulation regions, conditions of $\beta_1 \neq \beta_2$ and $\beta_4 \neq \beta_5$ need to be satisfied.

Figure 10:
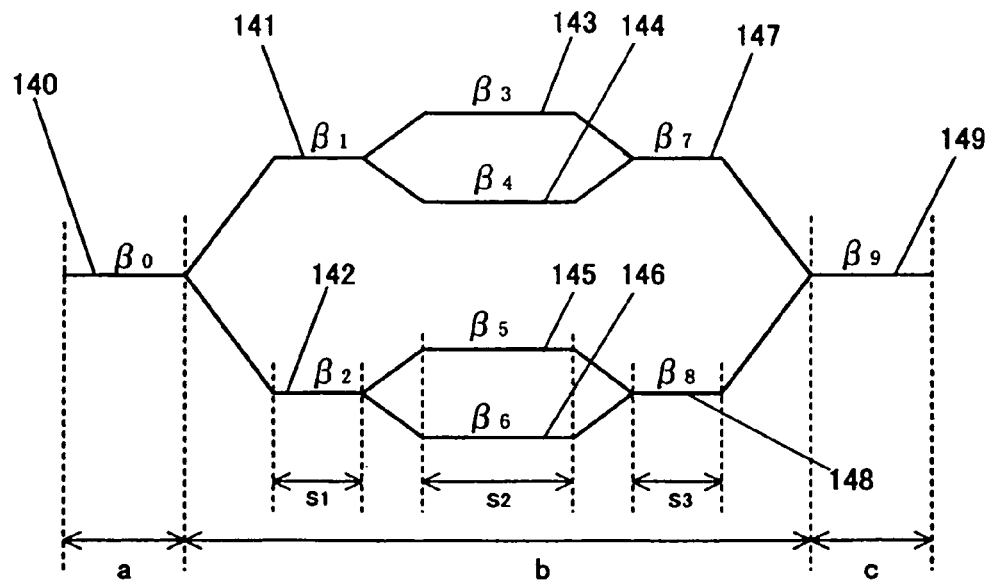
FIG. 10 is a view illustrating an optical control element according to a third embodiment of the present invention.

FIG. 10 is a view illustrating an optical control element according to a third embodiment of the present invention.

In the third embodiment, a technique of preventing the recoupling of non-guided light in a case when Mach-Zehnder type optical waveguides are connected in parallel to each other will be described.

When an optical waveguide shown in FIG. 10 is viewed along the propagating direction of a light wave within the optical waveguide, the optical waveguide includes a non-modulation region 'a', a modulation region 'b', and a non-modulation region 'c' in this order. In addition, taking a closer look at the modulation region 'b', different regions are formed in the order of a region s1, a region s2, and a region s3.

In the case when the configuration of fine optical waveguide is included in the configuration of such large optical waveguide, it is preferable to first consider the relationship of propagation constants in the configuration of the large optical waveguide and then to consider the relationship of propagation constants in the configuration of the fine optical waveguide.

In the case of the entire optical control element, it is possible to suppress the recoupling of non-guided light if the following conditions are satisfied. The propagation constants of optical waveguides 140 to 149 are expressed as $\beta_0$ to $\beta_9$, as shown in FIG. 10.

(1) Relationship between the non-modulation region 'a' and the modulation region 'b': $\beta_0 \neq$ (at least one of $\beta_1$ to $\beta_8$)

(2) Relationship between the modulation region 'b' and the non-modulation region 'c': (at least one of $\beta_1$ to $\beta_8$)$\neq \beta_9$ In addition, in the case when optical waveguides 141 and 142 of the region s1 or optical waveguides 147 and 148 of the region s3 are short, it is not necessary to consider adjustment of the propagation constants $\beta_1$ and $\beta_2$ or $\beta_7$ and $\beta_8$.

Next, as for the configuration of the fine optical waveguide (sub-Mach-Zehnder type optical waveguide), modulation electrodes, such as a DC electrode, may also be disposed in the region s1 or the region s3 without being limited to only the region s2. However, since the configuration of the optical waveguide is the same as that of the Mach-Zehnder type optical waveguide shown in FIG. 7, the recoupling of non-guided light can be prevented according to the following conditions by applying the concept shown in FIG. 7. In addition, only an upper sub-Mach-Zehnder type optical waveguide is illustrated.

(1) Relationship between the region 's1' and the region 's2': $\beta_1 \neq \beta_3$ or $\beta_1 \neq \beta_4$ (2) Relationship between the region 's2' and the region 's3': $\beta_3 \neq \beta_7$ or $\beta_4 \neq \beta_7$ In order to prevent the crosstalk in the respective modulation regions, for example, conditions of $\beta_3 \neq \beta_4$ and $\beta_5 \neq \beta_6$ need to be satisfied in the region s2.

The various kinds of adjustment methods shown in FIGS. 5 and 6 may be adopted as methods of adjusting the propagation constant in FIGS. 7, 9, and 10. In addition, not only a propagation constant of an optical waveguide but also a propagation constant in a substrate region where non-guided light propagates may be adjusted.

Furthermore, in order to maintain the optical properties of an optical control element with higher performance, it is possible to equalize the influence of a stress occurring due to the temperature change by making an arrangement such that adjustment places of a propagation constant in branched optical waveguide portions are symmetrical with respect to a central point of the branched optical waveguide portions or by making an arrangement such that adjustment places of a propagation constant with respect to non-guided light are axisymmetrical with respect to an optical waveguide.

Moreover, in order to increase the optical coupling efficiency of an optical control element and an optical fiber such that decoupled light is not generated, it is preferable to set the propagation constant of an optical waveguide so as to be suitable for a single mode condition of the optical fiber.

Materials having an electro-optical effect, which are used for the optical control element according to the present invention, include a lithium niobate, a lithium tantalate, a PLZT (lead lanthanum zirconate titanate), a quartz, and a combination thereof, for example. In particular, lithium niobate (LN) crystal whose electro-optical effect is high is preferably used.

Figure 2:
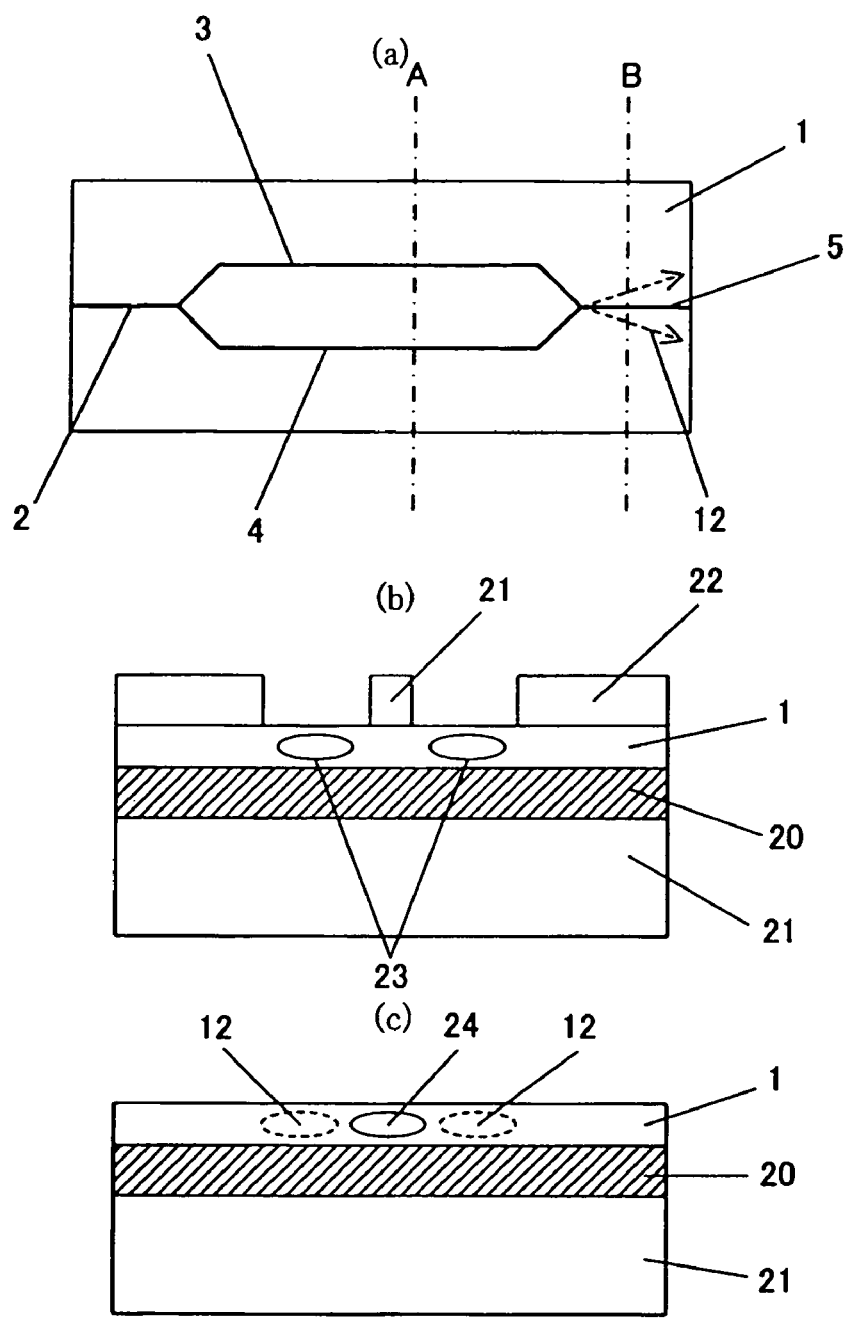
FIG. 2(a) is a view schematically illustrating a state where the mode field diameter width changes.
FIGS. 2(b) and 2(c) are cross-sectional views taken along lines A and B of FIG. 2(a), respectively.
Figure 3:
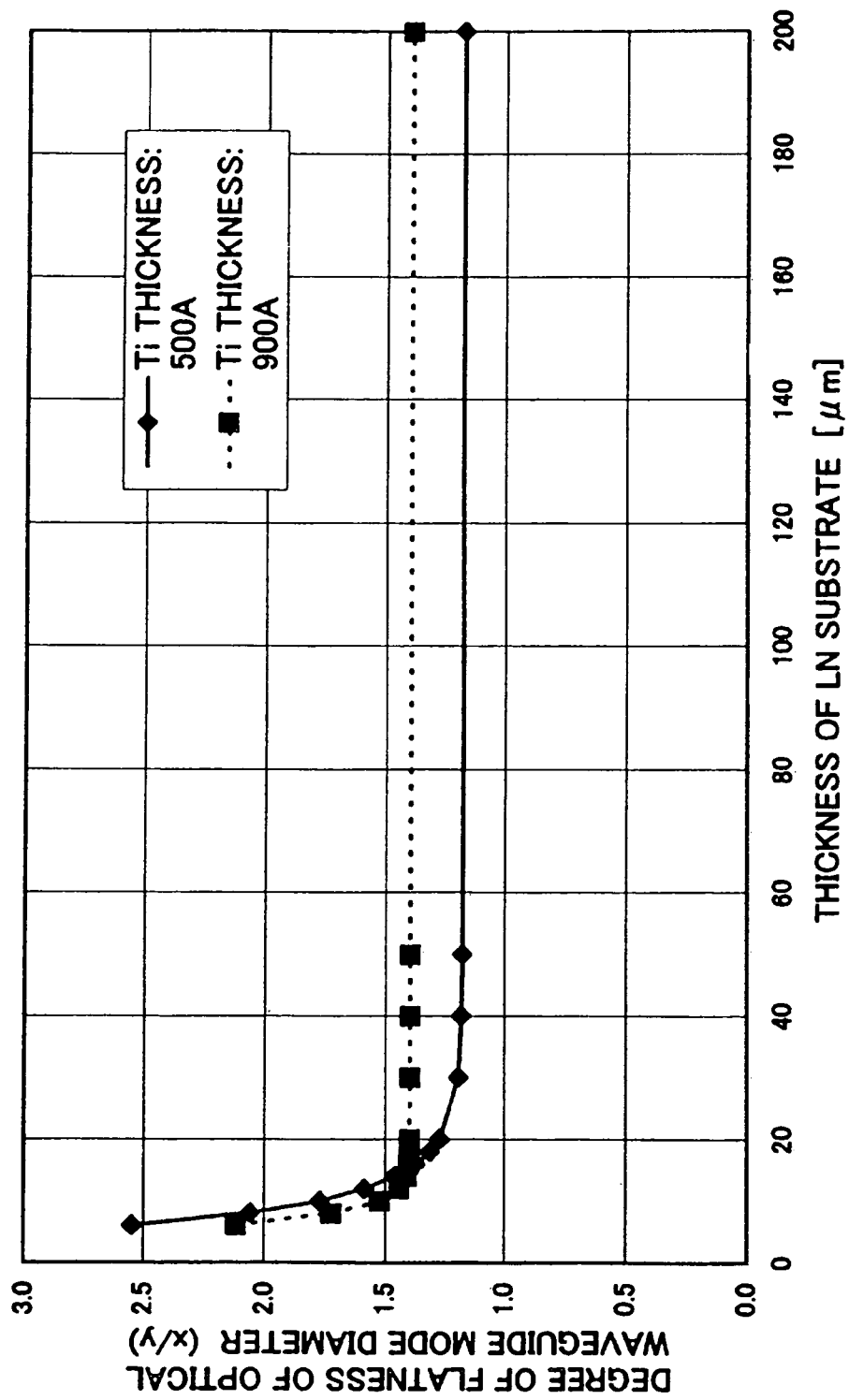
FIG. 3 is a graph illustrating the degree of flatness of an optical waveguide mode diameter with respect to the thickness of a substrate.

As shown in FIGS. 2 and 3, in the case that the thickness of at least a part of a region (an example of such part being shown in the region between lines A and B in FIG. 2(*a*)) in which an optical waveguide is formed, of a substrate is 30 μm or less or 0.3 to 2.0 times the mode field diameter width of guided light, particularly the guided light mode diameter tends to extend in the lateral direction as compared with the longitudinal direction, decoupled light and various kinds of scattered light increase, and the crosstalk between waveguides increases. In addition, since problems that non-guided light, such as decoupled light, propagates through a substrate like guided light and the non-guided light is easily recoupled with a later-stage waveguide occur noticeably, it is preferable to apply the present invention to an optical control element having such thin substrate portion.

Figure 11:
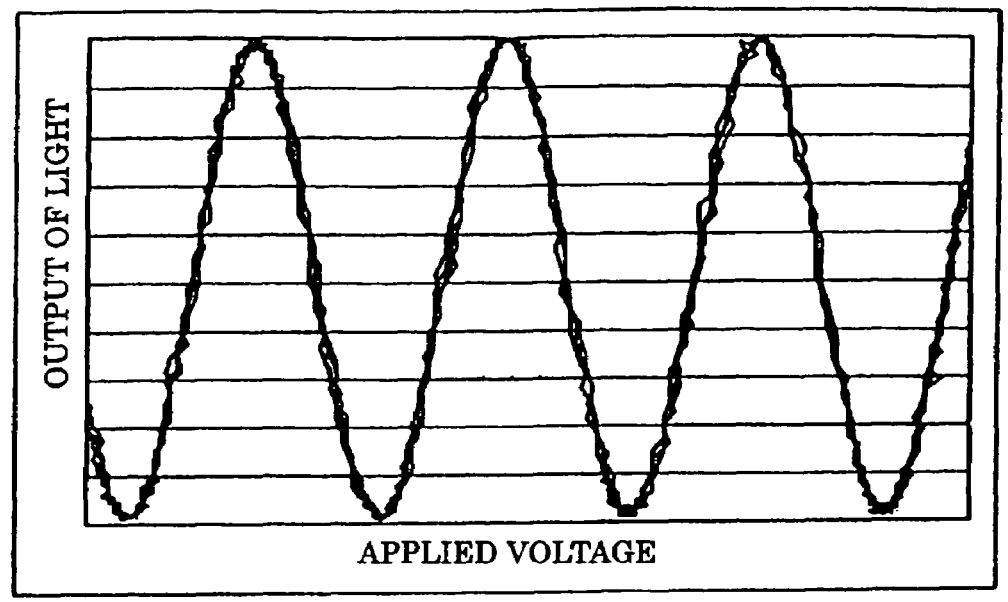
FIG. 11(a) is a graph for comparing a modulation curve of an optical control element in the present invention with a modulation curve shown in FIG. 11(b) of an optical control element in the related art.
Figure 11:
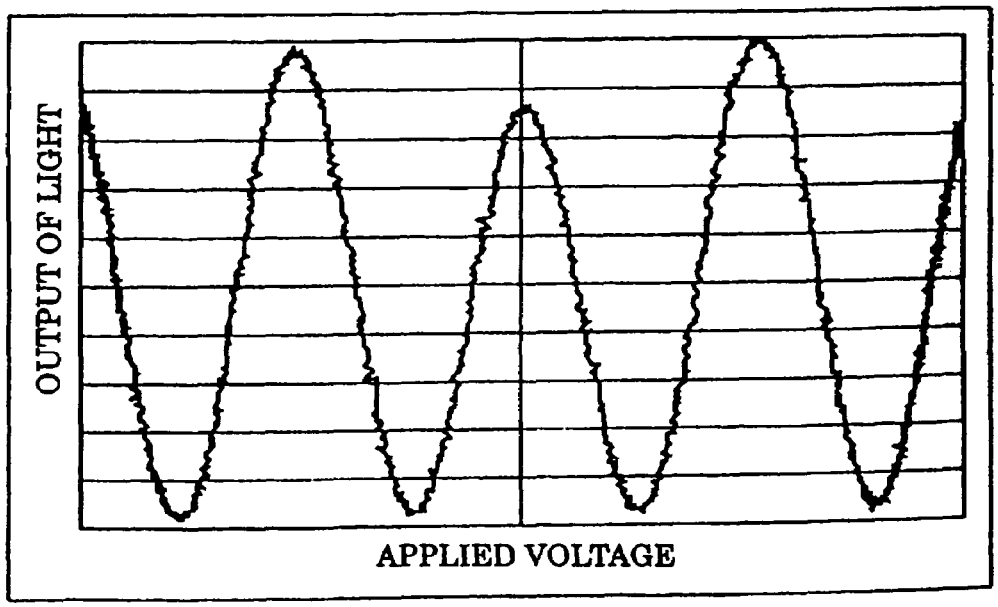

FIG. 11 illustrates a result of a modulation curve of the optical control element according to the present invention. In FIG. 11(*a*), the thickness of an LN substrate is set to 10 μm, and two adjustment regions (two regions of a CD region and a DE region) of the propagation constant of branched optical waveguide portions are set in an optical waveguide having the shape shown in FIG. 6. The width $w_1$ of each of the input-side optical waveguide portion, the output-side optical waveguide portion, and the CD region of the branched optical waveguide portion 3 (DE region of the branched optical waveguide portion 4) where the propagation constant is adjusted is set to 6 μm, and the width $w_2$ of each of the other regions is set to 7 μm. In addition, the length of each region is set to $L_1 = L_2 = 15$ mm.

A case shown in FIG. 11(*b*) is the same as that shown in FIG. 11(*a*) except that all widths in an optical waveguide are set to 6 μm.

Taking a look at graphs shown in FIG. 11, it is understood that the modulation curve is very distorted due to influence of non-guided light in a known optical modulator, as shown in FIG. 11(*b*), while a condition of the modulation curve is improved as a very satisfactory condition in an optical modulator to which the present invention is applied, as shown in FIG. 11(*a*).

The present invention is not limited to the optical control element described above. For example, details related to the branched optical waveguide may be applied to a plurality of adjacent optical waveguides. In addition, the above method of adjusting the propagation constant may also be appropriately performed as necessary, for example, the width of an optical waveguide may be adjusted together with diffusion or loading of a material.

INDUSTRIAL APPLICABILITY

As described above, according to the present invention, it is possible to provide an optical control element in which non-guided light is prevented from entering into an optical waveguide and which is excellent in optical properties, such as optical modulation properties.

The invention claimed is:

1. An optical control element comprising:
   a substrate formed of a material having an electro-optical effect; and
   an optical waveguide with at least one Mach-Zehnder type optical waveguide having an input-side optical waveguide portion, two branched optical waveguide portions and an output-side optical waveguide portion formed on a top or a bottom surface of the substrate,
   wherein
      propagation constants in a non-modulation region of the input-side optical waveguide portion and the output-side optical waveguide portion are set to be different from a propagation constant in a modulation region of the branched optical waveguide portions,
      the modulation region of the branched optical waveguide portion is divided into three or more regions,
      in the respective three or more regions, propagation constants are set such that the propagation constants are not equal to each other in the two branched optical waveguide portions, and
      a total sum of effective propagation constants obtained by multiplying each propagation constant by a length of each of the respective three or more regions are set to be equal in the respective branched optical waveguide portions.

2. The optical control element according to claim 1, wherein adjustment of the propagation constant of the optical waveguide is performed by adjusting a refractive index of the optical waveguide.

3. The optical control element according to claim 2, wherein adjustment of the refractive index of the optical waveguide is performed by changing a width of the optical waveguide.

4. The optical control element according to claim 2, wherein adjustment of the refractive index of the optical waveguide is performed by diffusing or loading a material, which changes the propagation constant, in the optical waveguide, near the optical waveguide, or on the optical waveguide.

5. The optical control element according to claim 4, wherein the material which changes the propagation constant contains at least one of $MgO$, $SiO_2$, $TiO_2$, and $ZnO$.

6. The optical control element according to claim 1, wherein the propagation constant of a light wave propagating through the optical waveguide satisfies a single mode condition in the input-side optical waveguide portion.

7. The optical control element according to claim 1, wherein a thickness of at least a part of a region of the substrate in which the optical waveguide is formed is 30 μm or less.

8. The optical control element according to claim 1, wherein a thickness of at least a part of a region of the substrate in which the optical waveguide is formed is 0.3 to 2.0 times a mode field diameter width of guided light.

9. The optical control element according to claim 2, wherein a thickness of at least a part of a region of the substrate in which the optical waveguides are formed is 30 μm or less.

10. The optical control element according to claim 2, wherein a thickness of at least a part of a region of the substrate in which the optical waveguides are formed is 0.3 to 2.0 times a mode field diameter width of guided light.

11. The optical control element according to claim 3, wherein a thickness of at least a part of a region of the substrate in which the optical waveguides are formed is 30 μm or less.

12. The optical control element according to claim 3, wherein a thickness of at least a part of a region of the substrate in which the optical waveguides are formed is 0.3 to 2.0 times a mode field diameter width of guided light.

13. The optical control element according to claim 4, wherein a thickness of at least a part of a region of the substrate in which the optical waveguides are formed is 30 μm or less.

14. The optical control element according to claim 4, wherein a thickness of at least a part of a region of the substrate in which the optical waveguides are formed is 0.3 to 2.0 times a mode field diameter width of guided light.

* * * * *